(12) United States Patent
Rios-Quesada et al.

(10) Patent No.: US 10,491,092 B2
(45) Date of Patent: Nov. 26, 2019

(54) COMPACT POSITIONING ASSEMBLY COMPRISING AN ACTUATOR AND A SENSOR BUILT INTO THE YOKE OF THE ACTUATOR

(75) Inventors: Javier Rios-Quesada, Besançon (FR); Michaël Delbaere, Avanne (FR); Guillaume Loussert, Besançon (FR)

(73) Assignee: MOVING MAGNET TECHNOLOGIES (MMT), Besançon (FR)

( * ) Notice: Subject to any disclaimer, the term of this patent is extended or adjusted under 35 U.S.C. 154(b) by 631 days.

(21) Appl. No.: 14/236,274

(22) PCT Filed: Jul. 30, 2012

(86) PCT No.: PCT/FR2012/051797
§ 371 (c)(1),
(2), (4) Date: Mar. 14, 2014

(87) PCT Pub. No.: WO2013/017794
PCT Pub. Date: Feb. 7, 2013

(65) Prior Publication Data
US 2014/0203669 A1  Jul. 24, 2014

(30) Foreign Application Priority Data
Aug. 1, 2011 (FR) ..................... 11 57043

(51) Int. Cl.
*H02K 41/02* (2006.01)
*H02K 33/02* (2006.01)
(Continued)

(52) U.S. Cl.
CPC .......... *H02K 41/02* (2013.01); *H02K 11/215* (2016.01); *H02K 33/02* (2013.01); *H02K 33/12* (2013.01)

(58) Field of Classification Search
CPC ...... H02K 41/02; H02K 29/08; H02K 11/215; H02K 33/02; H02K 33/12; H02K 33/07
(Continued)

(56) References Cited

U.S. PATENT DOCUMENTS 4,086,519 A * 4/1978 Persson .................. G01D 5/145
310/68 B
4,665,348 A * 5/1987 Stupak, Jr. ............ H01F 7/1844
310/14

(Continued)

FOREIGN PATENT DOCUMENTS

FR  2682542 A1  4/1993
FR  2774824 A1  8/1999
(Continued)

OTHER PUBLICATIONS

JP 2003319631 A Description, English machine translation.*
(Continued)

*Primary Examiner* — Michael Andrews
(74) *Attorney, Agent, or Firm* — Harness, Dickey & Pierce, P.L.C.

(57) ABSTRACT

A positioning assembly includes a position sensor and a magnetic actuator, the actuator including a stator assembly formed of at least one ferromagnetic stator bearing at least one electric power supply coil and a yoke able to move relative to the stator assembly, the actuator having a geometry that is of revolution or periodic about an axis referred to as the main axis passing through the yoke, the sensor having at least one permanent magnet secured to the yoke and at least one magneto-sensitive probe that is fixed in relation to the magnet and able to measure the amplitude or direction of the magnetic field emitted by the magnet. The
(Continued)

yoke has an interior recess including the main axis of the actuator, and the magnet is positioned inside the recess and secured to the yoke.

25 Claims, 4 Drawing Sheets

(51) Int. Cl.
    *H02K 33/12*     (2006.01)
    *H02K 11/215*     (2016.01)

(58) Field of Classification Search
    USPC .............................................. 310/12.19, 12.9
    See application file for complete search history.

(56) References Cited

U.S. PATENT DOCUMENTS

| | | | |
|---|---|---|---|
| 5,359,288 A * | 10/1994 | Riggs | G01B 7/02 188/284 |
| 5,444,313 A | 8/1995 | Oudet | |
| 5,559,378 A | 9/1996 | Oudet et al. | |
| 5,793,173 A * | 8/1998 | Henschel | B60J 7/0573 318/286 |
| 5,942,832 A | 8/1999 | Oudet | |
| 6,084,320 A * | 7/2000 | Morita | F04B 35/045 310/12.33 |
| 6,236,125 B1 * | 5/2001 | Oudet | H02K 33/16 310/12.02 |
| 6,249,065 B1 | 6/2001 | Oudet et al. | |
| 6,313,553 B1 | 11/2001 | Gandel et al. | |
| 7,589,445 B2 | 9/2009 | Gandel et al. | |
| 7,898,122 B2 | 3/2011 | Andrieux et al. | |
| 2001/0035213 A1 * | 11/2001 | Yoneda | F01L 1/46 137/554 |
| 2003/0090265 A1 * | 5/2003 | Wan | G01D 5/14 324/207.25 |
| 2005/0023905 A1 * | 2/2005 | Sakamoto | H02K 33/16 310/12.17 |
| 2005/0098153 A1 | 5/2005 | Bornmann et al. | |
| 2007/0176497 A1 | 8/2007 | Chitayat et al. | |
| 2007/0210658 A1 * | 9/2007 | Terauchi | H02K 5/04 310/68 B |
| 2009/0045683 A1 * | 2/2009 | Vermeulen | H02K 41/033 310/14 |
| 2010/0156205 A1 * | 6/2010 | Davis | H02K 11/048 310/46 |
| 2010/0176695 A1 * | 7/2010 | Tezuka | G01D 5/145 310/68 B |

FOREIGN PATENT DOCUMENTS

| | | | |
|---|---|---|---|
| FR | 2791487 A1 | | 9/2000 |
| FR | 2882432 A1 | | 8/2006 |
| JP | 2001-214858 A | | 8/2001 |
| JP | 2003319631 A | * | 11/2003 |
| JP | 2005168264 A | * | 6/2005 |

OTHER PUBLICATIONS

JP 2003319631 A Drawing.*
JP 2005168264 A Description, English machine translation.*
JP 2005168264 A Drawing.*

* cited by examiner

COMPACT POSITIONING ASSEMBLY COMPRISING AN ACTUATOR AND A SENSOR BUILT INTO THE YOKE OF THE ACTUATOR

CROSS-REFERENCE TO RELATED APPLICATIONS

This application is a National Phase Entry of International Application No. PCT/FR2012/051797, filed on Jul. 30, 2012, which claims priority to French Patent Application Serial No. 1157043, filed on Aug. 1, 2011, both of which are incorporated by reference herein.

FIELD OF THE INVENTION

The present invention relates to an electromechanical assembly for performing a linear or rotary positioning, comprising an electric actuator and a position sensor wherein the position sensor is entirely built in the volume of the actuator and is at least partially insensitive to the magnetic field produced by the actuator.

BACKGROUND

In the field of electric positioning assemblies, using magnetic position sensors for detecting the position of a movable element of an actuator is well known in the prior art. In most cases, the position detection is performed using a device attached to the actuator, as in application FR288737 which provides using a sensor having a permanent magnet attached to the yoke of the actuator in a configuration enabling the sensor to be insensitive to the magnetic field produced by the actuator. This type of device enables a reliable analogue detection (knowledge of the position of the movable portion relative to the stationary stator portion) but has a major drawback which is its relative overall dimensions which are added to that of the actuator. Although its compact design is often put forward, while ensuring insensitivity to the magnetic field created by the actuator itself, the fact remains that the actuator-sensor assembly is formed of two distinct subassemblies the overall dimensions of which are the sum of the dimensions of the subassemblies. On the other hand, in most actuators, advantage may be taken of a mechanical configuration naturally acting as a magnetic shielding as described in application FR288737. Thus the size of such a solution is not only excessive, but the sensor thus positioned on the top of the actuator requires additional ferromagnetic parts required for shielding the latter so as to minimize the effects of the magnetic fields originating from the actuator on the sensor.

Similarly, the application FR 2791487 is known, which provides for the integration of a magneto-sensitive probe inside the magnetic circuit by creating an additional air gap. The integration of the sensor is thus optimal as regards the overall dimensions, but at the expense of the force or the torque produced by the actuator. As a matter of fact, in the case of actuators with movable magnets, the introduction of an air gap in the stationary or movable ferromagnetic parts entails a modification in the form of the effort produced by the creation of a reluctant (i.e. without current) component which is not constant over the displacement. This not constant force may be a problem in some applications. In addition, the introduction of such additional air gap also reduces the proportional type effort since it induces a greater voltage loss in the magnetic circuit thus modified. Eventually, since the magnetic flux created by the coil also goes through the measurement air gap, the probe signal highly depends on the current and therefore requires knowing current to make the appropriate correction.

In some applications, the performances required by the actuator are such that all the space available is used for its overall dimensions, so that there is no space available to install a sensor at the end or at the periphery thereof. Various solutions then exist to have a built-in position detection, more particularly by measuring the coil inductance when the latter moves on with the position. However, this technique requires, on the one hand, a particularly sensitive and difficult to adjust electronic control, and on the other hand, this cannot be considered for actuators with so-called "proportional" movable magnets, the inductance of which is not or slightly modified according to the position. An additional sensor outside the volume of the actuator must be used then.

U.S. Patent Publication No. 2005/0098153 is also known, which provides for building the magnetic sensor inside the yoke, within a rotary positioning actuator. If the overall dimensions are thus reduced relative to the solutions providing an attached exterior sensor, the non-symmetry of the actuator makes the sensor very sensitive to the field emitted by the actuator.

The Japanese Patent Application JP 2001/214858 discloses an actuator comprising a linear motor and detection means for detecting the position of the drive object. This actuator comprises a detection element which is located outside the axis of symmetry of the actuator, so that the magnetic field insensitivity of the actuator is possible only when using a huge shielding about the detection element.

U.S. Patent Publication No. 2007/0176497 discloses a rotary actuating system comprising a control system and a rotary-linear actuator having a movable plunger and associated coils. The coils may be energized to interact with associated magnets to cause a corresponding displacement of the piston, which may include a rotary and/or linear displacement. The network interface helps the control system of the rotary-linear actuating system to receive control information from the built in network. The control system can control an amplifier for energizing the coils based on the control information.

The patent application EP0076726 discloses a Stirling cycle cryogenic refrigeration unit comprising a reciprocating element accommodated in a body housing containing a working fluid. The mechanical drive means is coupled to said body for reciprocating said body within said housing for selectively expand and compress said working fluid. Non-contact bearing means on said housing can be actuated to center said body in said housing.

SUMMARY

The present invention proposes to remedy the main drawbacks above by providing a compact positioning including a position sensor built inside the actuator and having no sensitivity to the magnetic field emitted by the latter. Particularly, the invention is intended to improve the position detection of the part of an actuator, having a geometry that is symmetric or periodic, able to move relative to a central axis of the positioning assembly, called the main axis, whether the actuator is rotary or linear.

The invention more particularly relates to a positioning assembly comprising a position sensor and a magnetic actuator, with the actuator assembly comprising a stator formed of at least one ferromagnetic stator having at least one electric power supply coil, and a yoke able to move relative to the stator assembly, the actuator having a geometry of revolution or periodic about a so-called main axis passing through the yoke, the sensor having at least one permanent magnet secured to the yoke and at least one magneto-sensitive probe fixed relative to the magnet and able to measure the amplitude or direction of the magnetic field emitted by the magnet, the yoke has an interior recess comprising the main axis of the actuator, and the magnet is positioned inside the recess and secured to the yoke.

According to a preferred embodiment, the magneto-sensitive probe is positioned close to the main axis inside the recess, with at least a detection axis oriented perpendicularly to the main axis. In a preferred embodiment, the electromagnetic actuator is an actuator having one or more movable magnets, positioned on the yoke. In a secondary embodiment, the electromagnetic actuator is a variable reluctance actuator without magnets. In another secondary embodiment, the electromagnetic actuator is a variable reluctance hybrid actuator with permanent magnets.

In a particular embodiment, the sensor magnet has variable intensity or direction magnetisation according to the direction of displacement. In another particular embodiment, the sensor magnet is multipolar with n distinct magnetization directions. In another particular embodiment, the sensor magnet is unipolar, i.e. has a single direction of magnetization and has a uniform geometry according to the direction of displacement or a variable geometry according to the direction of displacement.

In an alternative embodiment, the sensor magnet is made of remanent steel having a large coercive field strength, as described in the application FR2882432. In a particular embodiment, the magneto-sensitive element is a Hall probe sensitive to the amplitude of the magnetic field emitted by the magnet of the sensor. In another particular embodiment, the magneto-sensitive element is a Hall probe sensitive to the direction of the magnetic field emitted by the magnet of the sensor.

In another embodiment, the magneto-sensitive element is a magneto-resistive sensor. Preferably, said sensor magnet is positioned totally inside the recess of the yoke without forming a protrusion above the yoke. In an alternative embodiment, the magneto-sensitive probe is borne by a support acting as a mechanical guide of the yoke and may act as a magnetic shielding.

Advantageously, the insensitivity of the sensor to the magnetic field emitted by the actuator is secured, in a first embodiment, by positioning at least one magneto-sensitive element on the main axis. As a matter of fact, the axisymmetry or periodicity of the actuator ensures that any magnetic field produced by the actuator theoretically has a tangential direction on its axis of symmetry. Thus, by positioning at least one magneto-sensitive element on this axis and by orienting its axis of sensitivity perpendicularly to the main axis, the sensor insensitivity is ensured.

Still advantageously, in a second embodiment, the insensitivity of the sensor to the magnetic field emitted by the actuator is ensured by the configuration of the yoke completely surrounding the magneto-sensitive element, thereby promoting a magnetic shielding without requiring additional parts. This is particularly necessary when the direction of the magnetic field (and not its amplitude) is detected, since requiring at least two perpendicular axes of sensitivity. If a component may be made insensitive to exterior fields, the second component requires shielding. This function is naturally filled by the yoke but its shape optimization may become necessary depending on the geometry and performances required.

The sensor defined by the present invention may be intended both for a linear actuator and for a rotary actuator wherein its characteristics of compactness and insensitivity to the field emitted by the actuator may be implemented in the same way. The present invention discloses the general principle of compact integration of a sensor inside an actuator without modifying the overall dimensions of the latter. The various technologies of actuators and magnetic sensors are not exhaustively exposed here but may be selected and implemented in an integration according to the present invention by the persons skilled in the art having at his/her disposal a well known significant and detailed prior art.

BRIEF DESCRIPTION OF THE FIGURES

Other characteristics and advantages of the invention will become apparent upon reading the following detailed exemplary embodiments with reference to the appended figures, wherein.

DETAILED DESCRIPTION

Figure 1:
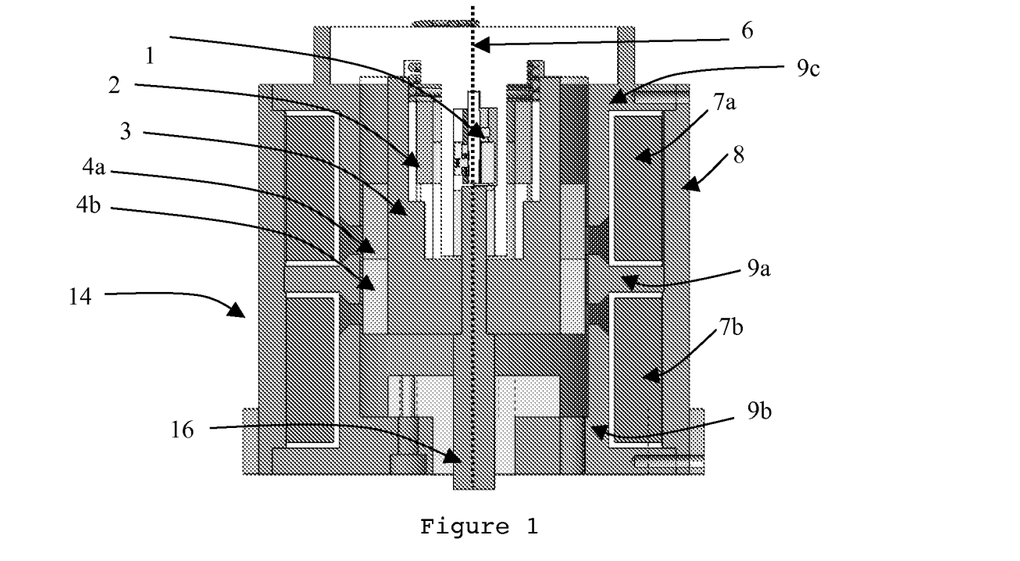
FIG. 1 is a cross-sectional view of the positioning assembly, in linear version, according to a first embodiment of a movable magnet actuator.

FIG. 1 shows a first embodiment of the invention, wherein the actuator is a movable magnet 4a, 4b actuator and has a so-called "proportional" behaviour. As a matter of fact, the force produced on the displacement of the actuator is constant and proportional to the current injected into the electric power supply coils 7a and 7b as described in application FR2682542. This actuator consists of a fixed stator assembly comprising two coils 7a, 7b connected in series or in parallel and a ferromagnetic stator 10 formed by an exterior ferromagnetic tube 8, a central ferromagnetic pole 9a and two side ferromagnetic poles 9b, 9c.

The actuator also comprises an assembly able to move relative to the stator assembly, formed of a ferromagnetic yoke 3 whereon two magnets 4a, 4b are fixed and secured on a permanent output shaft 16 for moving any exterior member along the main axis 6. The actuator thus formed has an axisymmetry about the main axis 6 and the magnets 4a, 4b advantageously have a radial magnetization, i.e. along a radius originating from the main axis 6. When the coils 7a, 7b are energized, the poles 9a, 9b, 9c of the stator are so polarized that the magnets 4a, 4b are drawn to a preferred position where the magnetic fields are aligned. Thanks to the shape and the dimensions of the various magnetic poles formed on the stator and the movable part, the force obtained for a given supply current is constant over a defined displacement which may typically be of several millimetres, here of about 5 mm.

Figure 2:
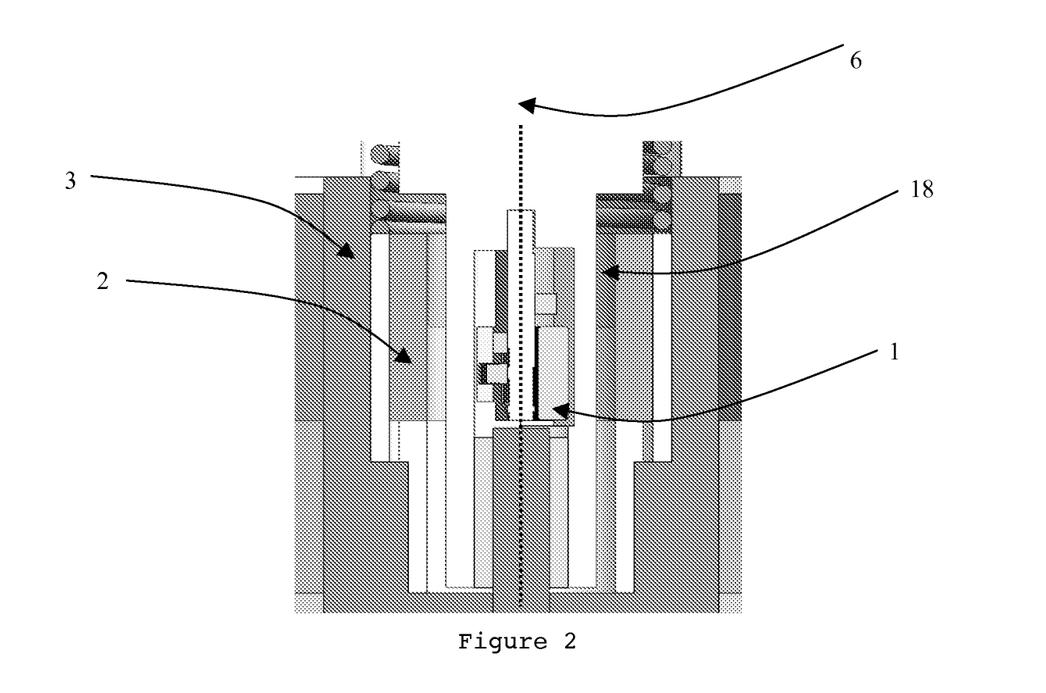
FIG. 2 is a detailed cross-sectional view of the position sensor of FIG. 1.

The sensor according to the present invention, which is illustrated separately in FIG. 2, is installed inside the yoke 3 in a recess 18 thereof, formed by a magnet of the sensor 2 attached to the yoke 3 and a magneto-sensitive probe 1 fixed relative to the stator assembly of the actuator. Preferably but not restrictively, the probe 1 is located near the axis of axisymmetry 6 in order to overcome the magnetic field produced by the actuator. As a matter of fact, because of the axisymmetry of the actuator, the magnetic field produced by the coils 7a, 7b and the magnets 4a, 4b is theoretically null in all directions perpendicular to the axis of axisymmetry 6. This property may then be used to position at least one of the magneto-sensitive elements of the probe 1 on or near the axis of axisymmetry 6, so that its sensitivity direction is perpendicular to the axis 6, thus being responsive to the amplitude or the direction of the magnetic field produced by the sensor magnet 2 only. In this embodiment, the sensor magnet 2 is in the form of two radially magnetized rings that do not prevent the free rotation of the axis of the actuator during its linear displacement, but this embodiment of the magnet is not restrictive.

However, this position of intrinsic insensitivity of the actuator is not required in all the embodiments when the yoke 3, as illustrated in FIG. 1, is sized to achieve an effective magnetic shielding ensuring the probe 1 insensitivity to the magnetic field originating from the actuator. The dimensions of the yoke (thickness, height, . . . ) are thus dictated by the minimum level of the disturbing magnetic field accepted by the probe 1 according to the application and the level of accuracy required from the sensor.

The positioning of the magneto-sensitive probe 1 near the axis of revolution of the actuator and on the upper part of the yoke 3 makes it possible to use a portion of the yoke 3 which is generally not useful to the magnetic flux since it corresponds to a relatively small cross-section relative to the main flow passage sections in the actuator and away from the center, depending on the height, of the actuator where the possible saturation is the strongest. Thus, the positioning of the sensor at the center of the actuator in the yoke almost does not affect the behaviour of the actuator with current. Only the behaviour with the strongest electric currents—where the magnetic saturation is significant—may be changed, but this case only corresponds to a one-time use of the actuator, which has nothing to do with the continuous operation thereof.

Figure 3:
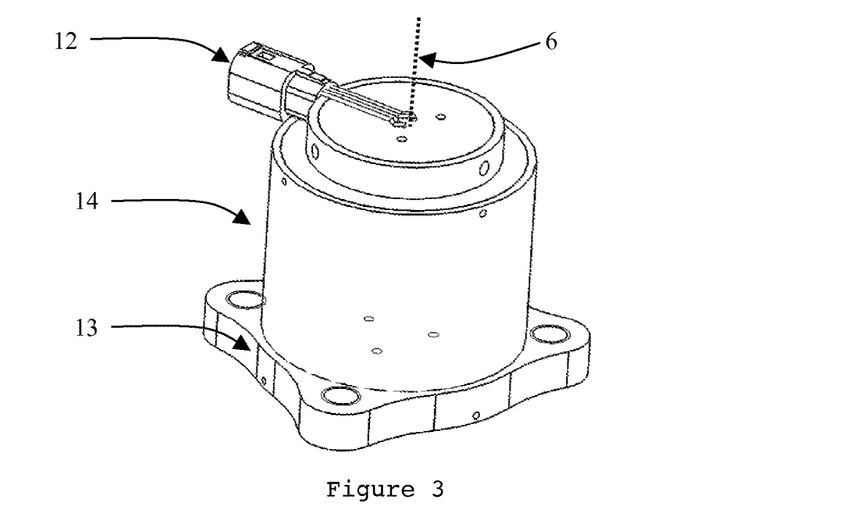
FIG. 3 shows a three-quarter view of the positioning unit shown in FIGS. 1 and 2.

FIG. 3 shows the positioning assembly in full view where the geometry of revolution of the actuator about the axis of axisymmetry 6 can be noted. In this exemplary embodiment, an electric connector 12 is visible on the upper part of the positioning assembly enabling the connection of the actuator and the sensor of the positioning assembly 14. The positioning assembly 14 may be fixed to an exterior support by means of a punctured fastening element 13. The output shaft 16, which is not visible in FIG. 3, is thus connected to the member to be moved at the bottom of the positioning assembly 14.

Figure 4A:
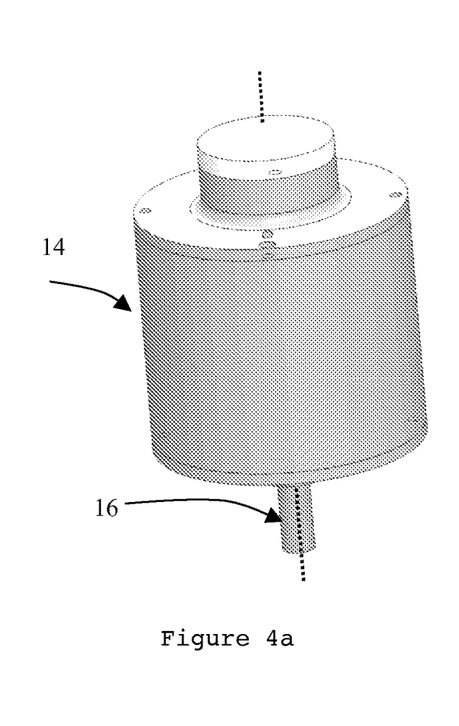
FIGS. 4a and 4b show the positioning unit, in linear version, according to a second embodiment comprising a movable magnet actuator.
Figure 4B:
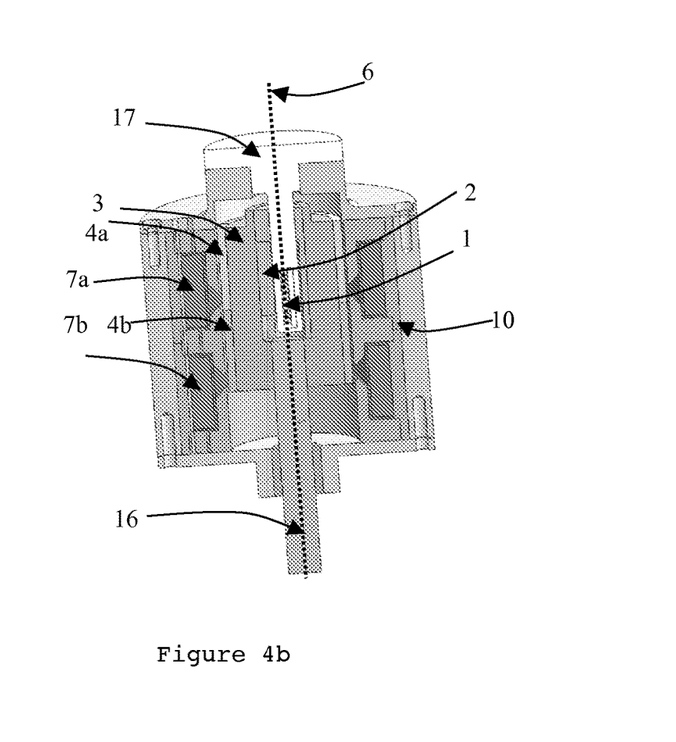

FIG. 4a shows a positioning assembly 14 in a second embodiment as seen from the outside, and FIG. 4b shows the same positioning assembly 14 in a cross-sectional view detailing the inside and all the components. The displacement of the actuator is much greater than that of the actuator of FIGS. 1 to 3, i.e. about 15 mm. This view of FIG. 4b shows the same architecture of the actuator formed for the stator assembly by three poles 9a, 9b and 9c, two electric power supply coils 7a, 7b and having, for the movable assembly, a yoke 3 bearing two magnets 4a, 4b and moving an output shaft 16, along the axis 6, for actuating an exterior member depending on the intended application. The actuator assembly thus formed has a symmetry of revolution about the axis 6.

The position sensor formed by a parallelepiped magnet 2 fixed to the yoke 3 and a magneto-sensitive probe 1, i.e. a Hall probe positioned on the axis of axisymmetry 6 of the positioning assembly 14 are positioned inside the recessed yoke 3. When positioned on said axis 6, the probe 1 has at least one of its axes of sensitivity oriented in a direction perpendicular to the axis of revolution 6 so as to be insensitive to the magnetic field produced by the actuator and to detect the amplitude or the direction of the magnetic field produced by the sensor magnet 2 only. This probe 1 is borne by an element 17 guiding the yoke 3 or even preventing the anti-rotation thereof, with such element 17 having a dual function making it possible to keep the compact characteristic of the positioning assembly 14 formed.

Figure 5A:
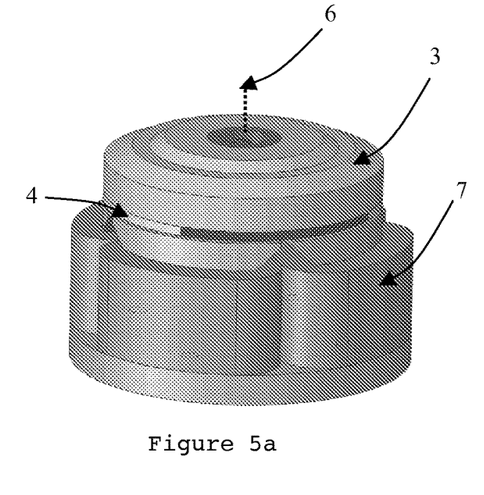
FIGS. 5a and 5b show the positioning assembly in rotary version.
Figure 5B:
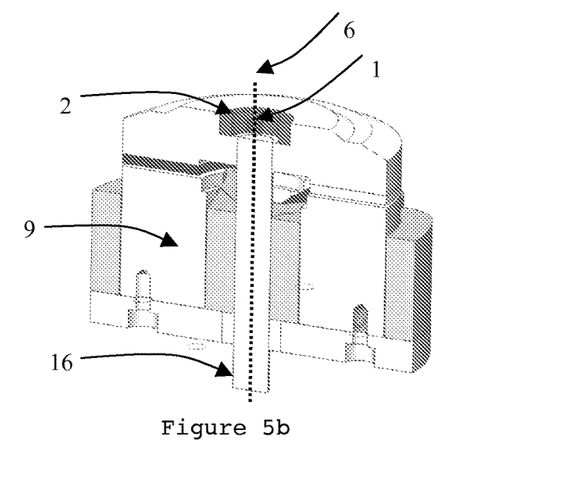

FIG. 5a shows the positioning assembly 14 in a rotary embodiment, and FIG. 5b shows the same assembly in a cross-sectional view through the main axis 6 of the assembly 14. The actuator part, according to the teachings of the application FR2670629 is formed of four identical ferromagnetic poles 9, each bearing an electric power supply coil 7, with the stator assembly thus formed being attached to a ferromagnetic base 5. Above said stator assembly formed, separated by an air gap, is positioned the assembly able to move rotationally relative to the stator assembly in a plane perpendicular to the main axis 6. This movable assembly is formed by a yoke 3 bearing a magnetized disk 4 consisting of 4 magnetized sectors. The thus formed actuator has a periodicity of 90° about the main axis 6.

The detection portion is provided by a sensor magnet 2 fixed to the yoke 3 in a recess 18 formed therein. A magneto-sensitive probe 1 is positioned on or close to the main axis 6, and stationary relative to the sensor magnet 2. The periodicity of the actuator ensures that, at any point on the main axis 6, the magnetic field normal to said axis 6 is theoretically null, providing the probe 1 with a direction of insensitivity to the magnetic field emitted by the actuator.

Figures 6A, 6B:
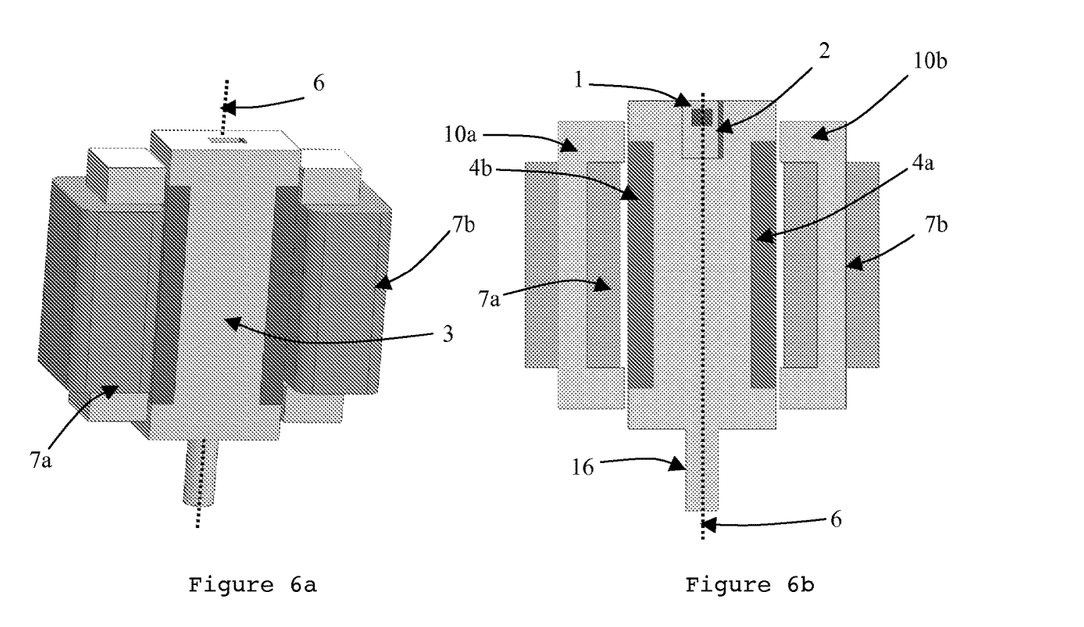
FIGS. 6a and 6b show the positioning assembly in linear version, according to a third embodiment comprising a variable reluctance hybrid actuator with movable magnets.

FIG. 6a shows the positioning assembly 14 in another linear embodiment, and FIG. 6b shows the same assembly along a cross-sectional plane passing through the main axis 6. In this embodiment, the actuator consisting of a movable ferromagnetic yoke 3 bearing two magnets 4a, 4b has an extrusive geometry but a periodicity of 180° about the main axis 6. As a matter of fact, with this periodicity about the main axis 6, the magnet 4a corresponds to the magnet 4b and for the stator, the ferromagnetic stator 10a and the coil 7a correspond to the ferromagnetic stator 10b and the coil 7b. The magnetic field thus produced by the actuator (magnets and coils) is theoretically null in the direction orthogonal to the main axis 6 on this axis 6. This characteristic is advantageously used to install, in the recessed 18 yoke 3 of the actuator, a sensor magnet 2 fixed to said yoke 3 and a magneto-sensitive probe 1 positioned in the vicinity of the axis 6 so that at least one of its axes of sensitivity is on the axis 6 in an orthogonal direction. The insensitivity of the probe 1 to the magnetic field of the actuator is thus provided. In these FIGS. 6a and 6b, the actuator is of the hybrid type, having a magnet 4a, 4b embedded in the yoke 3 and generating an axial force component along the axis 6, having a proportional origin and a component having a quadratic origin according to the current, as described in the application FR 2774824 from which this design originates.

Figure 7A:
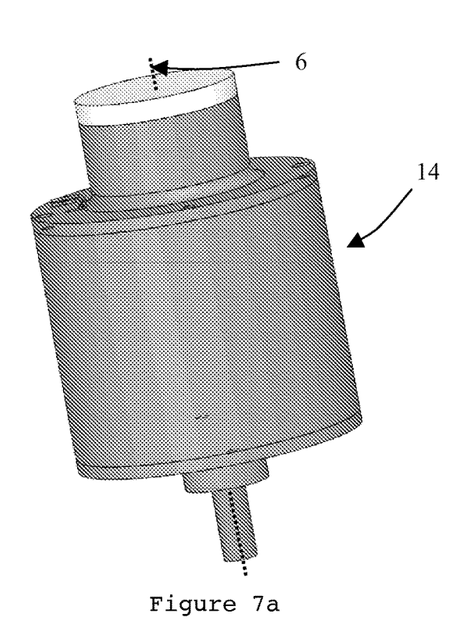
FIGS. 7a and 7b show the positioning unit in linear version, according to a fourth embodiment comprising a variable reluctance hybrid actuator with movable magnets.
Figure 7B:
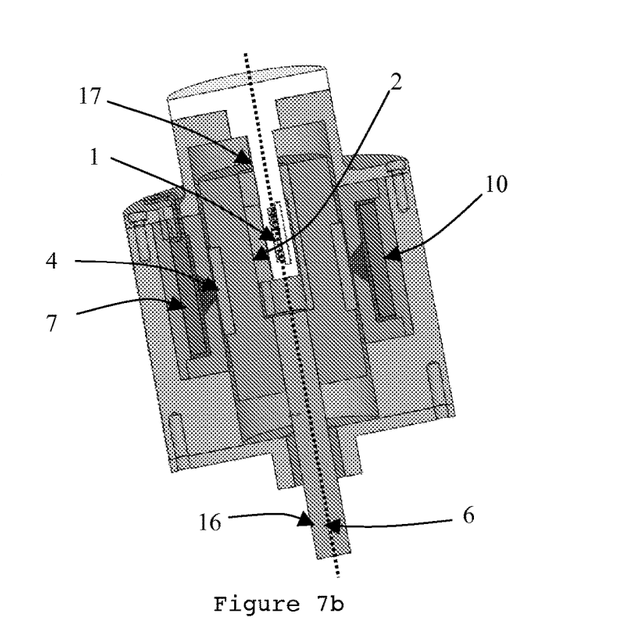

FIGS. 7a and 7b, respectively full and sectional views of another embodiment of the positioning assembly 14, have a positioning assembly 14 having the same properties as the positioning assembly 14 of FIGS. 4a and 4b except for the actuator function. The latter is provided with a variable reluctance hybrid actuator with magnets, similar in principle to the one already shown in FIGS. 6a and 6b in an extrusive version. The yoke 3 thus bears a magnet 4 embedded in said yoke 3 and the stator part consists of a single coil 7 of revolution about the main axis 6.

Figure 8A:
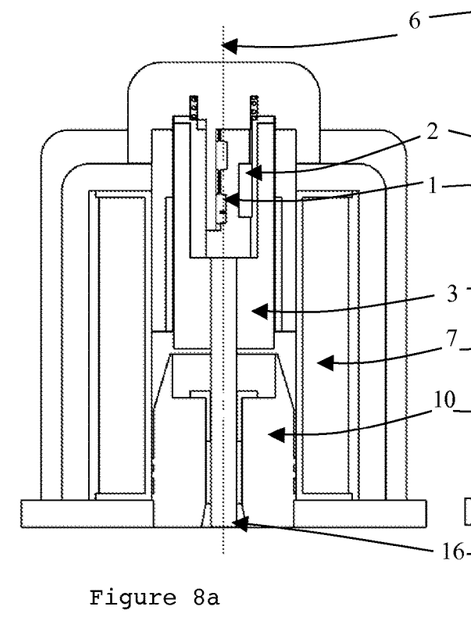
FIGS. 8a and 8b show cross-sections of the positioning assembly according to the fourth embodiment.
Figure 8B:
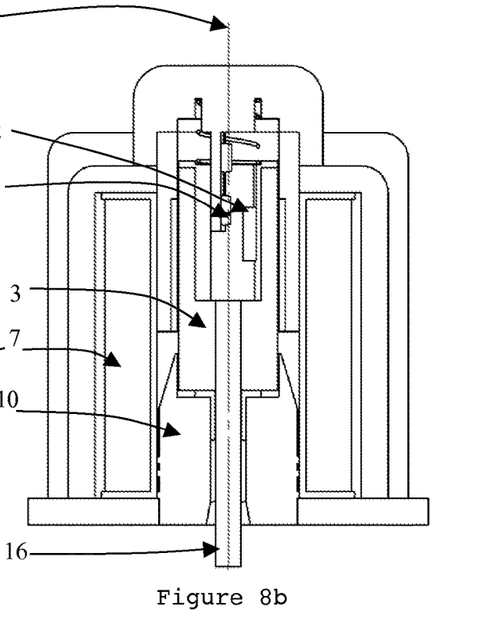

FIGS. 8a and 8b show two sectional views of the same actuator, the yoke 3 of which is able to move in two different positions. This is a variable reluctance actuator, commonly called "solenoid", formed of a ferromagnetic stator 10 locally having a conical shape and an electric power supply coil 7. By varying reluctance when the electric current flows in the coil 7, the yoke 3 is attracted to the bottom of the actuator, as shown in FIG. 8b. When the current no longer flows in the coil, the yoke 3 is in an upper position as shown in FIG. 8a, for example, and returned by a spring (not shown) which exerts a returning force onto the axis of the "solenoid". The actuator has an axisymetric geometry about the main axis 6, whereon a magneto-sensitive probe 1 is positioned stationary relative to the stator 10 and at least one of the axes of sensitivity of which is in the orthogonal direction to the main axis 6. Due to the axisymmetry, this axis of sensitivity of the probe 1 does not receive the magnetic field emitted by the electric coil 7. A sensor magnet 2 is secured to the yoke 3 and therefore moves opposite the probe 1 according to the position of the yoke 3 relative to the stator 10.

The invention claimed is:

1. A positioning assembly comprising:
a position sensor;
a magnetic actuator comprising a stator assembly formed of at least one ferromagnetic stator bearing at least one electric power supply coil and a rotor assembly comprising a yoke able to move relative to the stator assembly;
the actuator having a geometry that is symmetric or periodic about a main axis passing through the yoke with an equal number of rotor and stator pole(s);
the sensor having at least one permanent magnet secured to the yoke, and at least one magneto-sensitive probe fixed relative to the magnet and able to measure an amplitude or direction of a magnetic field emitted by the magnet;
the yoke having an interior recess comprising the main axis of the actuator, and the magnet positioned inside the recess and secured to the yoke;
the magneto-sensitive probe being positioned on the main axis inside the recess with at least one detection axis being oriented perpendicularly to the main axis;
the magnetic field produced by the coil and the rotor pole(s) being essentially null in directions perpendicular to the main axis.

2. The positioning assembly according to claim 1, wherein:
the yoke is ferromagnetic and magnetically shields the magneto-sensitive probe;
the magnet is unipolar; and
the actuator is symmetric with respect to the main axis, which causes the magnetic field produced by the actuator to have a substantially tangential direction relative to the main axis, and therefore causes the position sensor to be insensitive to the magnetic field produced by the actuator.

3. The positioning assembly according to claim 1, wherein the actuator is an actuator comprising at least one movable magnet arranged on the yoke.

4. The positioning assembly according to claim 1, wherein the actuator is a variable reluctance actuator without magnets.

5. The positioning assembly according to claim 1, wherein the actuator is a variable reluctance hybrid actuator with permanent magnets.

6. The positioning assembly according to claim 1, wherein the magneto-sensitive probe is a Hall or magneto-resistive probe sensitive to the amplitude of the magnetic field emitted by the magnet of the sensor.

7. The positioning assembly according to claim 1, wherein the magneto-sensitive probe is a Hall probe sensitive to the direction of the magnetic field emitted by the magnet of the sensor.

8. The positioning assembly according to claim 1, wherein the sensor magnet is positioned totally inside the recess of the yoke, and the stator is part of a solenoid.

9. The positioning assembly according to claim 1, wherein the magneto-sensitive probe is borne by a support acting as a mechanical guide of the yoke.

10. The positioning assembly according to claim 1, wherein the sensor magnet has a variable intensity or direction of magnetisation according to the direction of displacement.

11. The positioning assembly according to claim 1, wherein the sensor magnet has a single direction of magnetization and has a uniform geometry according to the direction of displacement or a variable geometry according to the direction of displacement.

12. The positioning assembly according to claim 1, wherein the sensor magnet is remanent steel.

13. A positioning assembly comprising:
a position sensor;
a stator assembly formed of at least one ferromagnetic stator and electric power supply coils;
an elongated output shaft moveable relative to the stator assembly, a main axis passing through an elongated centerline of the shaft;
the sensor including at least one permanent magnet secured to the shaft and at least one magneto-sensitive probe being located on the main axis;
the magnet being at least partially surrounded by at least one of the coils;
the magneto-sensitive probe being positioned on the main axis with at least one detection axis being oriented perpendicularly to the main axis;
a magnetic field produced by the coils being essentially null in all directions perpendicular to the main axis, and such that magnetic force being constant in a displacement direction when energized; and
there are an equal number of rotor and stator pole(s).

14. The positioning assembly according to claim 13, wherein:
the stator is part of a solenoid; and
the magneto-sensitive probe measures an amplitude or direction of the magnetic field emitted by only the sensor magnet.

15. The positioning assembly according to claim 13, wherein the stator assembly is a variable reluctance actuator without magnets and the shaft is part of a ferromagnetic yoke.

16. The positioning assembly according to claim 13, wherein the stator assembly is a variable reluctance hybrid actuator with permanent magnets and the shaft is part of a ferromagnetic yoke.

17. The positioning assembly according to claim 13, wherein the magneto-sensitive probe is a Hall probe sensitive to an amplitude of a magnetic field emitted by the magnet of the sensor.

18. The positioning assembly according to claim 13, wherein the magneto-sensitive probe is a Hall probe sensitive to the direction of a magnetic field emitted by the magnet of the sensor, and the shaft rotates when the coils are energized.

19. The positioning assembly according to claim 13, wherein the sensor magnet is positioned totally inside a recess of the shaft which is part of a ferromagnetic yoke.

20. The positioning assembly according to claim 13, wherein the magneto-sensitive probe is borne by a support acting as a mechanical guide of a yoke of which the shaft is a part thereof.

21. A positioning assembly comprising:
a position sensor;
a stator assembly formed of at least one ferromagnetic stator and electric power supply coils;
a shaft moveable relative to the stator assembly, a main axis passing through an interior recess associated with the shaft and being a movement centerline;
the sensor including at least one permanent magnet secured to the shaft and at least one magneto-sensitive probe;
the probe being located closer to one end of the stator than an opposite end of the stator;
the magneto-sensitive probe being on the main axis inside the recess with at least one detection axis being oriented perpendicularly to the main axis; and
a magnetic field produced by the coils being essentially null in all directions perpendicular to the main axis.

22. The positioning assembly according to claim 21, further comprising a spring surrounding a portion of the shaft, the probe being located closer to the spring than the opposite end of the stator, and the positioning assembly being a solenoid.

23. The positioning assembly according to claim 21, wherein the probe is stationary relative to the stator and at least one axis of sensitivity is orthogonal to the main axis such that the orthogonal axis does not receive the magnetic field omitted by the coils.

24. The positioning assembly according to claim 21, wherein a quantity of the magnets is equal to a quantity of the coils.

25. The positioning assembly according to claim 21, wherein there are an equal quantity of rotor and stator poles.

* * * * *